Figure 1:
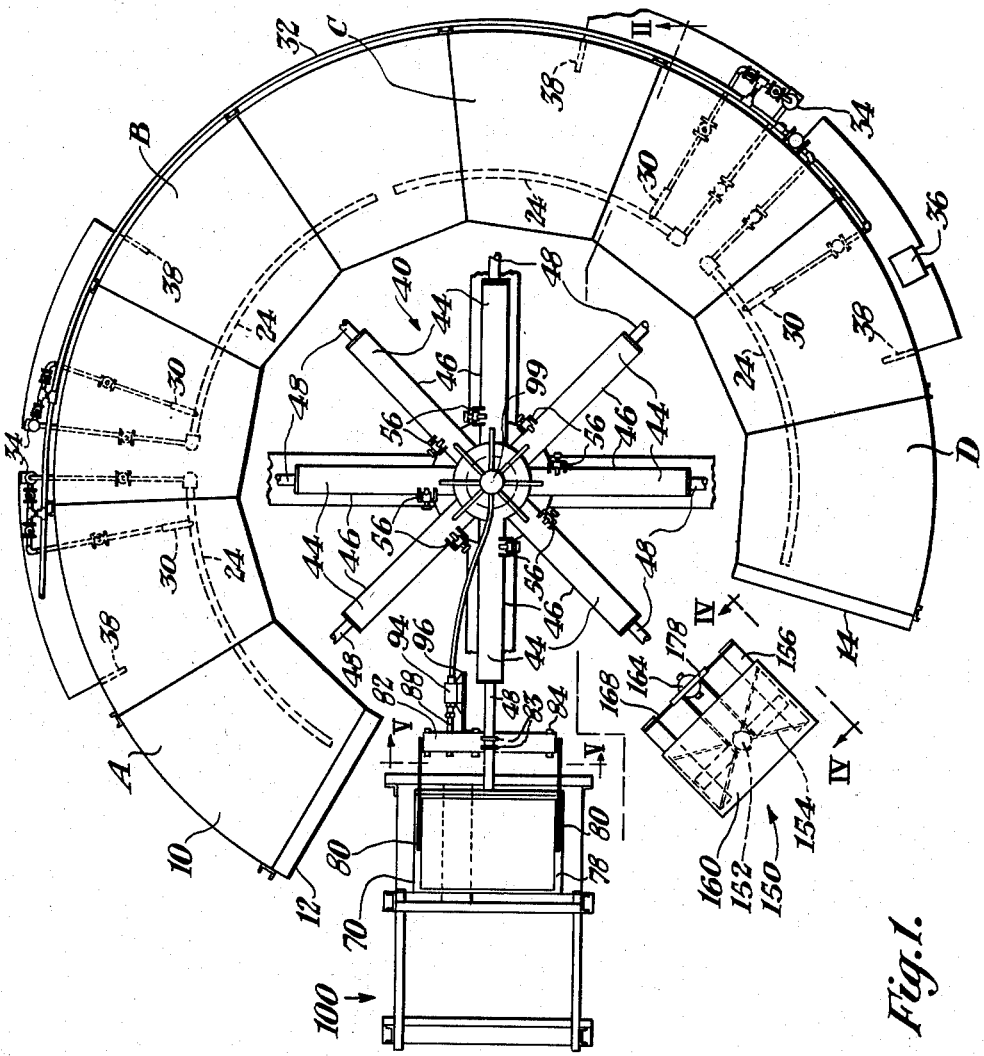

INVENTOR.
Ralph P. Davis
BY
HIS ATTORNEY

Nov. 30, 1954    R. P. DAVIS    2,695,431
ROTARY TYPE MOLDING MACHINE
Filed Sept. 22, 1950    5 Sheets-Sheet 3
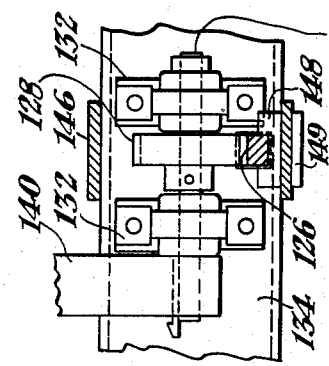
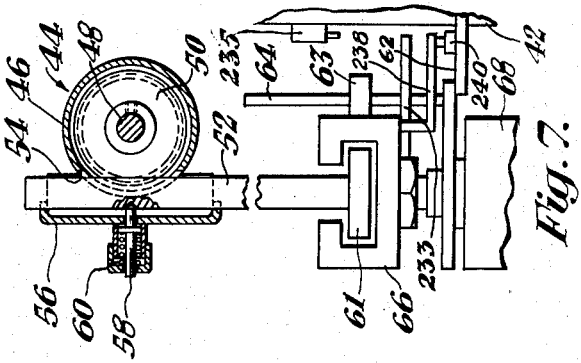
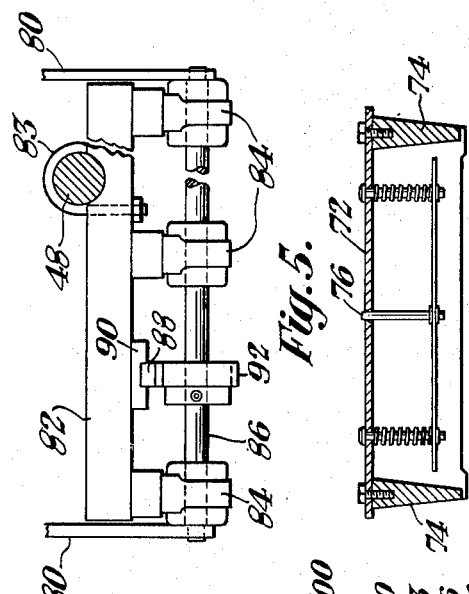
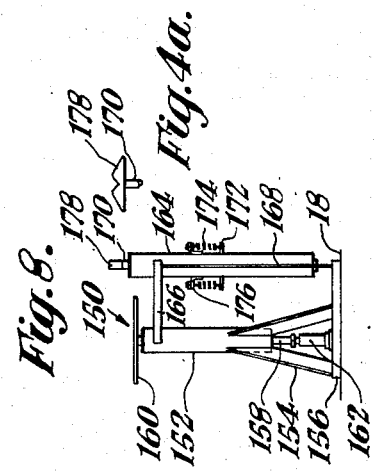
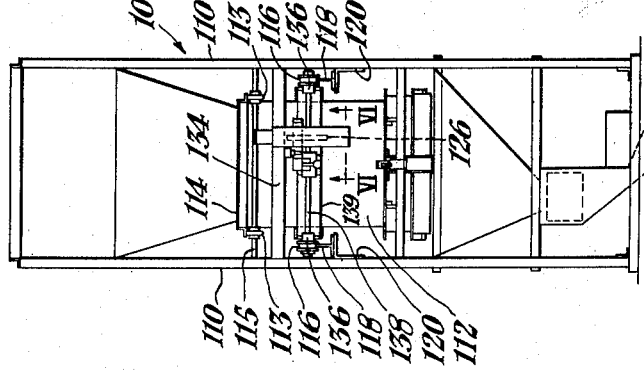
INVENTOR.
Ralph P. Davis
BY
HIS ATTORNEY

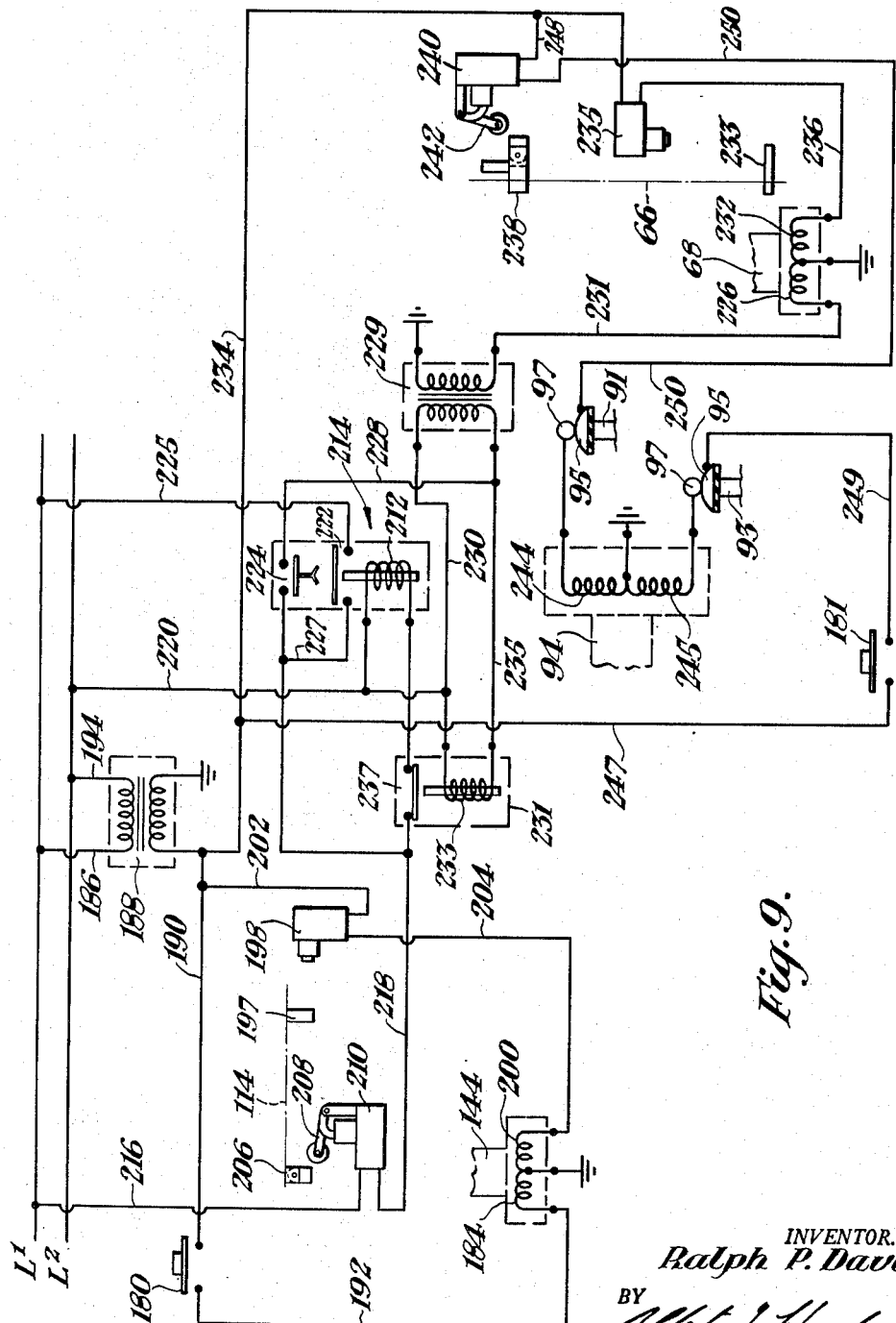

Nov. 30, 1954  R. P. DAVIS  2,695,431
ROTARY TYPE MOLDING MACHINE
Filed Sept. 22, 1950  5 Sheets-Sheet 5

INVENTOR.
Ralph P. Davis.
BY
*Albert J. Henderson*
HIS ATTORNEY

United States Patent Office 2,695,431
Patented Nov. 30, 1954

2,695,431

ROTARY TYPE MOLDING MACHINE

Ralph P. Davis, Squantum, Mass., assignor to Walworth Company, Boston, Mass., a corporation of Massachusetts Application September 22, 1950, Serial No. 186,199

18 Claims. (Cl. 22—21)

Mold forming apparatus

This invention relates to foundry mold forming apparatus and more particularly to apparatus for continuously producing baked shell-type molds by a sequence of automatic mold forming operations.

The molds to be formed by operation of the apparatus herein disclosed are produced from a dry mixture of inorganic molding material such as sand and a minor portion of plastic binder. The mixture is applied to mold forming devices or patterns which are initially heated to a temperature at which the binder softens and builds up a shell of the desired thickness. The patterns are then inverted to dump the excess molding material and return to initial position prior to passage through the oven portion of the apparatus. The baked molds are moved by the apparatus to an unloading station where they are ejected from the patterns which then move to the original loading station for further mold forming operations.

The component parts of the mold forming apparatus may be summarized as follows:

(a) An arcuate horizontal oven divided into four heating zones for different temperature conditions.

(b) A carrier in the form of a turret with means on each turret arm for receiving and supporting mold forming devices.

(c) Mechanism for indexing the turret and mold forming devices through the oven and an unloading station back to a loading station.

(d) A traversing hopper for loading mold forming material onto each mold forming device at the loading station.

(e) Mechanism for inverting the turret arms and mold forming devices individually to dumping position at the loading station and returning them to initial position.

(f) Mechanism for raising flasks from the mold forming devices prior to indexing the turret and loaded mold forming device into the oven.

(g) Mold ejecting means operable on the mold forming devices at the unloading station after passage through the oven.

(h) Mechanism for returning the flasks to position on the mold forming devices prior to indexing the turret to the loading station.

The apparatus of this invention is of particular advantage in forming molds of the described shell-type in large quantities. Since the molds can be set aside after completion and even stored for long periods of time before use in casting processes the continuous production feature of the apparatus may be put to full use at any convenient time. The apparatus may be operated under the control of one person and is of relatively simple nature embodying uncomplicated parts which are durable and rugged as required in general foundry practice.

Another object of the invention is to produce foundry molds by relatively unskilled labor without detracting from the quality of the molds so produced.

Another object of the invention is to continuously repeat the cycle of mold producing operations with different patterns if desired or with like patterns where high production rate of a specified type of mold is required.

Figure 2:
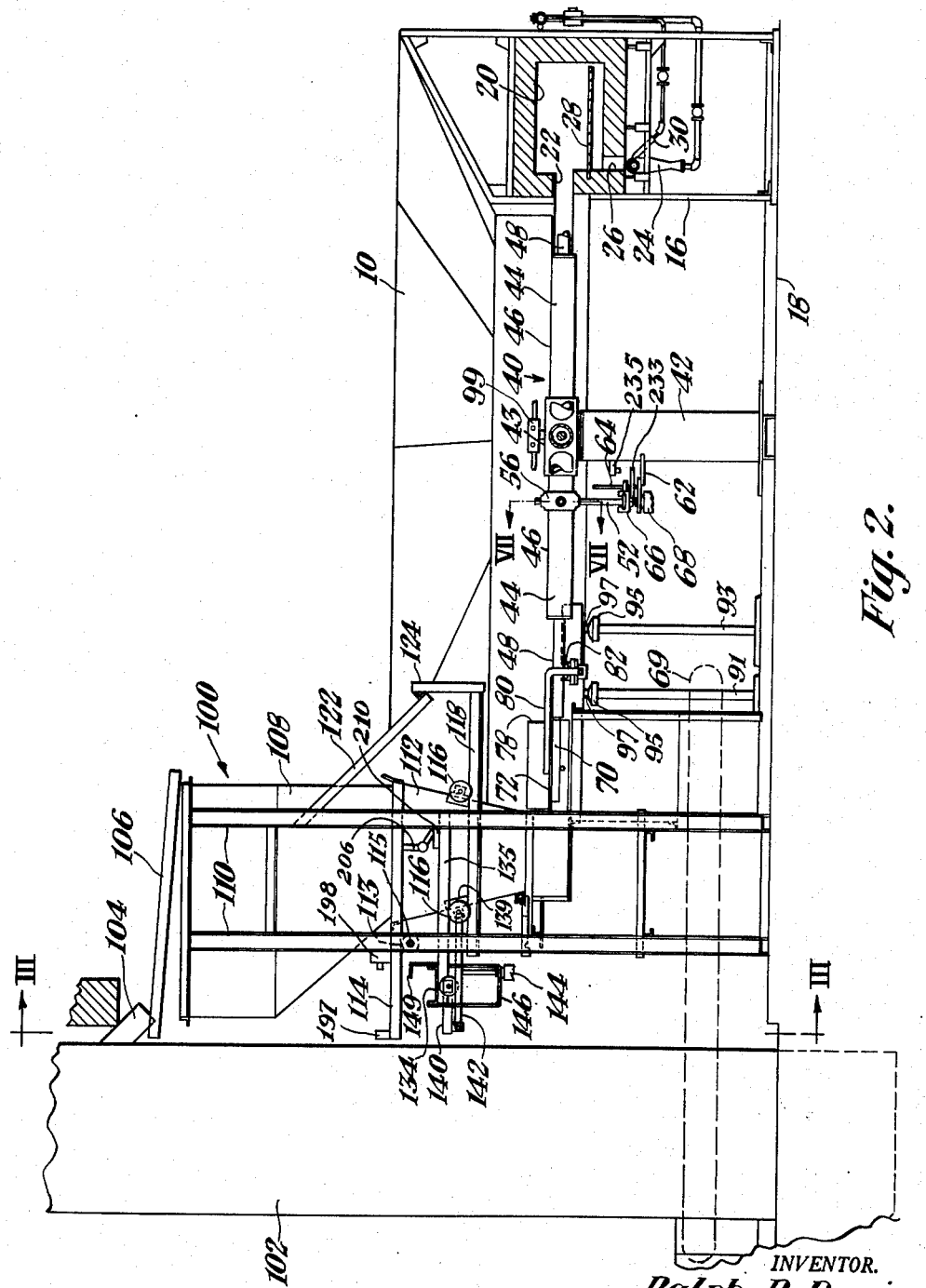
Figure 10:
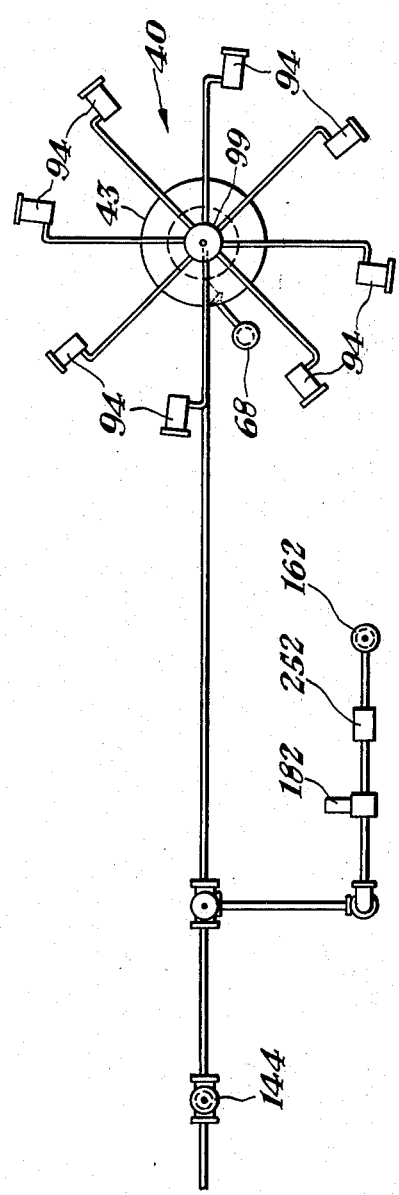
Figure 11:
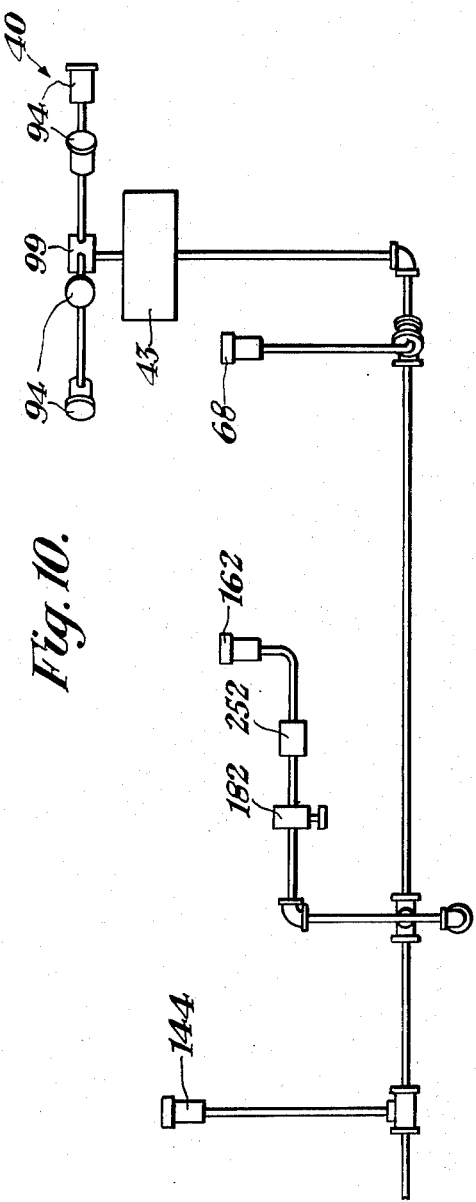

Other objects and advantages will become apparent from the following description taken in connection with the accompanying drawings, wherein:

Fig. 1 is a general plan view of the molding apparatus in somewhat schematic form, Fig. 2 is a longitudinal section taken on the line II—II of Fig. 1, Fig. 3 is an elevation looking in the direction indicated by the lines III—III in Fig. 2, Fig. 4 is an elevation taken at the unloading station as indicated by the line IV—IV in Fig. 1, Fig. 4a is a view of a detail of the indexing means shown in Fig. 4, Fig. 5 is an enlarged cross-section taken on the line V—V of Fig. 1, Fig. 6 is an enlarged cross-section taken on the line VI—VI of Fig. 3, Fig. 7 is an enlarged cross-section taken on the line VII—VII of Fig. 2, Fig. 8 is a partial sectional view on an enlarged scale of one of the pattern plates utilized in the apparatus, Fig. 9 is a wiring diagram of the electrical part of the control mechanism, Fig. 10 is a plan diagram of the fluid connections for the control mechanism, and Fig. 11 is an elevation diagram corresponding to Fig. 10.

The oven

Referring more particularly to the drawings, an oven 10 of arcuate form is provided with open ends 12 and 14 spaced one from the other. The oven 10 is mounted on a suitable support 16 secured to a foundation 18, such as a concrete floor. An arcuate passageway 20 of substantially rectangular cross-section is provided in the oven 10 and lined with fire-brick or other heat resistant material. The passageway 20 has an opening 22 in its front wall providing access to the interior.

Heating means for the oven 10 take the form of a plurality, in this instance four, gas burners 24 of arcuate tubular form located beneath the passageway 20 of the oven 10 which is provided with ports 26 in the wall thereof through which the flames of the burners 24 may project. A baffle plate 28 is provided above each of the ports 26 to prevent direct impingement of the flames with articles passing through the interior of the oven 10. Each of the burners 24 is provided with a pilot burner 30 by means of which ignition may be effected. The burners 24 and 30 may be supplied from a source of gas supply through a manifold 32 which extends partly around the exterior of the oven 10 for this purpose.

The oven 10 is divided into four heating zones A, B, C and D as indicated by the area covered by each of the burners 24. Each of these zones A–D inclusive, is preferably maintained at a different temperature under control of a plurality, in this instance four, thermostats, three of which are indicated by the numeral 34 and one by the numeral 36. Thermostat 36 may be of the indicating type while the thermostats 34 are not so equipped. Each of the thermostats 34 and 36 is provided with a bulb element 38 for location in one of the zones A, B, C and D, the temperature of which is to be controlled thereby.

Carrier or turret

A carrier or turret, designated generally by the reference numeral 40, is provided for rotary movement about a vertical axis such as the support 42 mounted on the foundation 18. The axis of the support 42 substantially coincides with the axis of the oven 10 so that a plurality, in this instance eight, of radial support means or turret arms 44 are adapted for movement in sequence through the oven passageway 20. Each of the turret arms 44 comprises an outer cylinder 46 supported at one end on a head element 43 mounted on the support 42 and terminating at the opposite end short of the wall of the oven 10. Rotatably mounted within the cylinder 46 is a shaft 48 which projects therefrom a sufficient distance to enter the oven passageway 20. The rotation of the turret is effected manually by the operator as will later be described.

Rotation of each shaft 48 about its horizontal axis is effected by the provision of a pinion gear 50 mounted thereon for engagement by a rack 52 which is adapted for movement substantially parallel with the axis of the support 42. As shown more clearly in Fig. 7, the outer cylinder 46 is cut-away, as at 54, to provide for engagement between the rack 52 and the pinion 50. The rack 52 is maintained in position by a rack holder 56 secured to the outer cylinder 46. The rack holder 56 has pin 58 and compression spring 60 associated therewith for locating the rack 52 in initial position.

Each of the racks 52 carried by the outer cylinders 46 is provided with a head element 61 as shown more clearly in Fig. 7. The heads 61 are adapted to sequentially engage with a T-slot formed in a slide member 66 carried on the movable portion of a fluid motor 68 which serves to operate the rack 52 and rotate the pinion 50 as previously described. The slide member 66 is prevented from rotation relative to the head 61 by engagement between an apertured lug 63 thereon with a slide rod 64 mounted on a plate 62 projecting from the support 42. The motor 68 may also be mounted on the plate 62 and is of conventional form, such as an air motor, which will be referred to more fully hereinafter.

The rotation of each shaft 48 about its horizontal axis at appropriate times in the cycle of operation will be described more fully hereinafter. It may be noted, however, that the operation is conducted for the purpose of dumping excess molding material on to a conveyor belt 69 which automatically returns it to the source of supply.

The terminal end of each shaft 48 carries a bifurcated member 70 which receives a pattern plate 72 which is mounted thereon for passage through the oven 10. One of the pattern plates 72 is shown more clearly in Fig. 8 as being mounted on a frame 74 and having ejector means in the form of spring biased pins 76 projecting through its upper surface. The pattern plates 72 may be all alike for producing similar molds or they may vary one from the other where different molds are desired.

Each of the pattern plates 72 is adapted for mounting a flask 78 thereon at appropriate times during the cycle of operation. Each of the eight flasks 78 comprises a rectangular frame open at both top and bottom and mounted upon a pair of elbow members 80 secured to opposite sides thereof. The elbows 80 are adapted to raise and lower the flask 78 relative to its pattern plate 72 in an automatic operation, it being understood that only the pattern plate 72 is indexed through the oven 10 while the flask 78 is raised from engagement therewith.

The means employed for raising and lowering each of the flasks 78 are shown in Figs. 1, 2 and 5 as comprising a channel member 82 extending transversely of the axis of the shaft 48 and secured thereto as by the U-bolts 83. The underside of the channel member 82 carries a plurality, in this instance three pillow-block bearings 84 for a shaft 86 upon which the elbows 80 are pivoted at opposite ends. The channel member 82 further carries a rack member 88 supported in a holder 90 and adapted for operative engagement with a pinion 92 secured on the shaft 86. The arrangement is such that longitudinal movement of the rack 88 will serve to rotate the shaft 86 through approximately 90°, thus moving the elbows 80 and the flask 78 carried thereby in an arcuate path toward and away from the pattern plate 72 between substantially vertical and horizontal limiting positions. Longitudinal movement is imparted to the rack 88 by a fluid motor 94, such as an air motor similar to the motor 68. The motor 94 is supported on a bracket 96 projecting from the channel member 82. As will be evident there are eight motors 94 and associated parts employed in this embodiment of the invention. Positioned between the open ends 12 and 14 of the oven 10 are what may be termed the loading and unloading stations. A post 91 extends from the foundation 18 into the loading station while a similar post 93 extends into the unloading station. Each post 91 and 93 carries an electrical contact element or brush 95 suitably insulated and formed of flexible metallic material of good electrical conductivity. The brushes 95 are positioned to make contact respectively with terminals 97 carried by the motors 94 during rotation of the turret 40 through the loading and unloading stations.

The flow of pressure fluid to the air motors 94 is conducted by provision of a conventional rotary pressure joint 99 carried by the head 43 of the support 42. A separate flexible hose connection is made from the rotary joint 99 to each motor 94. The operation of the motors 94 at the appropriate times during the cycle of operation will be described hereinafter.

*Hopper*

Positioned between the open ends 12 and 14 of the oven 10 in what may be termed the loading station is a hopper for the molding material, designated generally by the reference numeral 100. An elevator 102 is supported on the foundation 18 in the path of the conveyor 69 and may be of any conventional type having a chute 104 associated therewith. The molding material, as previously indicated, consists of a dry mixture of sand and a binder, but it will be apparent that any other suitable molding material may be employed. The chute 104 is positioned over a screen 106 which may be of the vibratory type if desired.

The hopper 100 includes a stationary container 108 which is supported beneath the screen 106 on channel members 110 extending to the foundation 18. Positioned below the container 108 and adapted to receive the contents thereof is a movable container 112 which is adapted to be reciprocated over the flask 78 for filling the same. A closure plate 114 extends from the upper edge of the movable container 112 for movement across the bottom of the stationary container 108 to prevent loss of the contents thereof when the movable hopper 112 is positioned above the flask 78. The closure plate 114 rides on a pair of rollers 113 carried by a shaft 115 supported at its opposite ends in the channel members 110.

The movable container 112 is mounted upon a plurality, in this instance four, wheels 116 positioned two on each side thereof. The wheels 116 ride upon a pair of rails 118 mounted on a pair of brackets 120 carried by the channel members 110. Suitable bracing members 122 and 124 may be employed if desired for supporting the ends of the rails 118 as shown in Fig. 2.

Referring now more particularly to Figs. 3 and 6, a rack 126 is positioned in operative engagement with a pinion 128 secured to a shaft 130. The shaft 130 is journaled in a pair of pillow-block bearings 132 secured to a channel support 134, which is mounted on a support arm 135 secured to channel members 110. A crank member 140 is keyed or otherwise fastened to one end of the shaft 130 which, as previously stated, is rotated by movement of the rack 126. Such rotation of the shaft 130 causes the crank 140 to move counterclockwise as viewed in Fig. 2. A connecting rod 142 extends from the crank 140 which is connected at its opposite end to a shaft 138 carrying the wheels 116. A pair of pillow-block bearings 136 carry the shaft 138 and are secured to a plate 139 on the movable container 112. A shaft 138 which carries the wheels 116 at either end thereof is journaled in the bearings 136. In this manner, the movable container 112 is moved over the flask 78 and such motion can be reversed by means to be described hereinafter.

Motion is imparted to the rack 126 for moving the movable container 112 as described by the actuating element (not shown) of a fluid motor, such as an air motor 144 similar to the motors previously described. The motor 144 is supported on a U-shaped bracket 146 as shown in Fig. 2 which is carried by the channel support 134. As in previous instances, the rack 126 may be supported in a holder 148 carried by the U-shaped bracket 146 for this purpose. A stop 149 in the form of an angular bar member projects from the bracket 146 into the path of movement of the rack 126 for limiting this movement. If desired, the motor 144 could be arranged to operate the movable container 112 directly without the interposition of the crank 140 and associated parts described.

*Mold ejecting means*

Positioned between the sand hopper 100 and the open end 14 of the oven 10 in what may be termed the unloading station is the ejecting mechanism designated generally by the reference numeral 150. The ejecting mechanism is shown in Figs. 1 and 4 as comprising a cylindrical housing 152 suported on a plurality of leg members 154 from a base 156 which is secured to the foundation 18. The housing 152 contains an axially movable rod member 158 carrying an ejecting plate 160 beyond the end of the housing 152. Movement of the rod member 158 is effected by a fluid motor device, such as an air motor 162, which is mounted between the base 156 and the rod member 158 for this purpose. Movement of the plate 160 toward and away from the housing 152 will serve to operate the ejector pins 76 of the pattern plate 72 and remove the mold formed thereon after passage through the oven 10.

Suitable indexing means are provided for locating the pattern 72 in position over the ejecting plate 160 at the unloading station. The indexing means take the form of a cylindrical housing 164 supported in substantially parallel relation with the housing 152 by a pair of strap members 166 which are secured at either end to the housings 152, 164. A pair of gusset plates 168 extend from the housing 164 to the base 156 to provide additional support for the housing 164.

A plunger 170 is mounted for reciprocation in the housing 164 and has a yieldable mounting therein provided by a support pin 172 which extends transversely of the plunger 170 through the wall of the housing 164 which may be suitably slotted for its reception. A pair of tension springs 174 are each connected at one end to the projecting ends of the pin 172 and at their opposite ends to a pair of brackets 176 carried on diametrically opposite sides of the housing 164. The end of the plunger 170 which projects from the housing 164 carries a notched plate 178 which is positioned in the path of movement of the shafts 48 associated with the carrier or turret 40. Since the notched plate 178 is yieldably mounted as described the shafts 48 will in sequence, serve to depress the plate 178 relative to the housing 164 and be retained within the notch provided in the plate 178. Under such conditions, the pattern plate 72 carried by the rod 48 will be positioned over the ejector plate 160 during the unloading operation.

Operation

A general description of the operation of the apparatus has been given in connection with the detailed description of the component parts. Each of the eight arms 46 of the turret 40 having its individual pattern plate 72 and flask 78 thereon may be indexed manually one position at a time from the loading station 100 through the oven sections A, B, C and D to the unloading station 150 bringing successively the other turret arms 44, pattern plates 72 and flasks 78 through the various stations. It will be understood that it takes six successive indexings to bring the individual turret arms 46 through and out of the oven 10 to produce a complete mold at the unloading station. The notched plate 178 provides a semi-positive stop during the indexing operations as will be apparent.

Referring now more particularly to Figs. 9, 10 and 11 showing the control mechanism for accomplishing the various functions outlined, it will be observed that both fluid pressure and electrical energy are utilized in this connection. Thus, in Fig. 9 a pair of control switches 180 and 181 which may be of the momentary contact snap-action type are positioned adjacent the unloading station 150 for convenient access by the single operator employed in the operation of the apparatus. This operator also has under his control at the unloading station 150 a foot-operated three-way valve 182, as indicated in Figs. 10 and 11, showing the fluid control arrangement. It should be observed that the electrical actuating means for the fluid motors 68, 94, 144, 162 need only momentary energization to effect complete operation of these motors.

Flask filling operation

With the parts positioned as shown in Figs. 1–3, the operator depresses the momentary contact control switch 180 to establish a circuit for a solenoid operator 184 which may be traced on Fig. 9 as follows: line wire L1, wire 186, primary coil of a step-down transformer 188, wire 190 from the secondary of transformer 188, switch 180, wire 192 and coil 184 to ground. Since the primary of transformer 188 is connected by wire 194 to the other line wire L2 and since the secondary of the transformer 188 is grounded, then the coil 184 becomes energized as soon as the circuit is closed across the switch 180. The manual pressure on switch 180 can then be released as previously indicated.

The solenoid coil 184 is operatively associated with a multiway valve (not shown) for controlling the flow of pressure fluid to the pressure motor 144. Operation of the motor 144 causes upward movement of the rack 126 forming part of the sand hopper 100. By the mechanism previously described, the movable container 112 of the sand hopper 100 is moved forward over the flask 78 which is positioned over one of the pattern plates 72. The stationary container 108 may be assumed to be filled with molding material so that the movable container 112 is loaded at the time of its traversing movement to deposit a quantity of the molding material in the flask 78. Since the pattern plate 72 associated with this flask 78 is assumed to have previously passed through the oven 10 in a preliminary heating operation, it is evident that a quantity of the molding material will adhere thereto from that contained in the flask 78.

When the counterclockwise movement of the crank 140 has proceeded through approximately 180°, then contact occurs between a push plate 197 carried by the closure plate 114 and a limit switch 198 which is fastened to a stationary part of the hopper 100 such as the channel members 110. The operation of the limit switch 198 to closed position serves to establish a circuit for a coil 200 operably associated with the same multiway valve with which the coil 184 is associated. The circuit for the coil 200 may be traced on Fig. 9 as follows: secondary of transformer 188, wire 202, limit switch 198, wire 204 and coil 200 to ground. The energization of the coil 200 causes reversal of the movement of the fluid motor 144 and consequent return of the movable container 112 to its initial position.

Dumping operation

As the crank 140 approaches its starting position a dog 206 carried by the closure plate 114 serves to depress an actuating lever 208 of a limit switch 210. The control mechanism for inverting the pattern plate 72 and flask 78 is now set in operation. The closing of the limit switch 210 serves to energize the coil 212 of a time delay relay designated generally by the reference numeral 214. This circuit may be traced on Fig. 9 as follows: line wire L1, wire 216, limit switch 210, wire 218, solenoid coil 212 of relay 214 and wire 220 to line wire L2.

Energization of the solenoid coil 212 of the time delay relay 214 serves after a predetermined time delay to close a pair of switches 222 and 224 both associated with the relay 214. Such operation serves to establish a circuit for a solenoid coil 226 of a multiway valve (not shown) operatively associated with the fluid motor 68 for operating the inverting mechanism. This circuit may be traced on Fig. 9 as follows: line wire L1, wire 225, switch 222, wire 227, switch 224, wire 228, primary of transformer 229, wire 230, and wire 220 to line wire L2. The secondary of transformer 229 is connected at one end by wire 231 to coil 226 and the other end of the transformer 229 and the coil 226 are both grounded. By means of the mechanism previously described, the pattern plate 72 and flask 78 are inverted for dumping the excess molding material in the flask 78 as soon as the motor 68 becomes operative. Such excess molding material falls on to the conveyor belt 69 and the remainder of the molding material adheres to the pattern plate 72 to form the mold part desired.

The establishment of the circuit previously traced for the time delay relay coil 212 also serves to establish a circuit for a magnetic contactor 231 which, upon termination of the time delay, serves to deenergize the entire relay circuit. Thus, proceeding from one terminal of the primary of transformer 229 by wire 230, coil 233 of contactor 231, and wire 235 to the opposite terminal of the primary of transformer 229, the coil 233 becomes energized and operates a solenoid to open its switch 237 in wire 230.

As the plunger of the fluid motor 68 approaches the end of its stroke and the flask 78 has been rotated approximately 180°, then a push plate 233 carried by the slide member 66 moves into contact with a limit switch 235 secured to the support 42. Such operation serves to establish a circuit for a coil 232 operatively associated with a multiway valve (not shown) controlling the fluid motor 68. The circuit for the coil 232 may be traced as follows: secondary of transformer 188, wire 234, limit switch 235, wire 236, and coil 232 to ground. The energization of the coil 232 causes a reversal of the fluid pressure in the fluid motor 68. Consequently, the flask 78 and pattern plate 72 return to initial position after the dumping operation.

Flask lifting operation

The return movement of the slide member 66 associated with the fluid motor 68 causes operative engagement of a dog 238 carried thereby with the operating lever 242 of a limit switch 240 secured to the support 42. Such engagement serves to initiate operation of the control mechanism for lifting the flask 78 from engagement with the pattern plate 72 prior to indexing the same through the oven 10.

The terminal 97 of a motor 94 is at this time in contact with the brush 95 on the post 91 at the loading station as described. Thus, closure of the limit switch 240 serves to establish a circuit for a solenoid coil 244 operatively associated with the multiway valve controlling flow of fluid to that fluid motor 94 which happens to be located in the loading zone. The circuit for the coil 244 may be traced as follows: secondary of transformer 188, wire 234, wire 248, limit switch 240, wire 250, coil 244 to ground. Operation of the fluid motor 94 serves to move the rack 88 to the left, as viewed in Fig. 1, and cause rotation of pinion 92, shaft 86 and elbows 80 for lifting the flask 78 from its engagement with the pattern plate 72 at the loading station.

*Flask lowering operation*

The terminal 97 of another motor 94 is at this time in contact with the brush 95 on the post 93 at the unloading station. As this last action is taking place in the loading position, the operator depresses the momentary contact control switch 181 which serves to energize the solenoid 245 associated with same valve as the coil 244 through a circuit which can be traced as follows: secondary of transformer 188, wire 147, switch 181, wire 249 to coil 245 and ground. The closing of this circuit causes operation of the multiway valve and fluid motor 94 in the unloading zone. Consecutively, the flask 78 which is positioned in such unloading station is lowered over its associated pattern plate by the means previously described and the apparatus is manually indexed by the operator from the unloading station into the loading station where the above cycle is repeated by operation of the starting button 180.

*Baking operation*

While the foregoing operations are being automatically conducted at the loading and unloading stations, the remainder of the turret arms 46 with the pattern plates 72 and molds thereon are being indexed through the oven 10. As previously noted, the flasks 78 are raised at such times and since, when raised, they are disposed in substantially vertical positions, they do not enter the passage 20 through the oven 10 but move in an arcuate path outside the oven 10. The loaded pattern plates 72 pass in sequence through the heating zones A, B, C and D to bake or cure the molding material and produce the desired shell-type mold on the pattern plates 72.

*Ejecting operation*

When a finished mold finally reaches the unloading station, then the ejecting mechanism 150 is brought into operation. The shaft 48 is positioned as described by the notched plate 178 so that the pattern plate 72 is positioned over the ejector plate 160. The operator depresses the foot-operated valve 182 which admits pressure fluid, such as compressed air, to the air motor 162. If desired, a speed control valve 252 may be included in the line to the motor 162. The ejector plate 160 is thus lifted to operate the ejector pins 76 carried on the pattern plate 72 and disengage the mold. The pattern plate 72 may then be inspected and oiled or otherwise treated if necessary. The flask positioning means is now brought into operation as before and the assembly indexed into the loading station to repeat the cycle.

The operation is thus continuous and semi-automatic under control of a single operator since while an ejecting operation is being conducted, the loading, dumping and baking operations are being performed at the other stations. It will be apparent that many changes may be made in the details of construction and arrangement of parts and that certain phases of the cycle may be rearranged or omitted all without departure from the scope of the invention as defined in the appended claims.

I claim:

1. In a mold forming apparatus, the combination of an oven having a passageway therethrough, a carrier having support means pivotally mounted thereon and movable through said oven passageway, separate loading and unloading stations, pattern means on said support means for conveyance thereby through and out of said oven passageway to said loading station, means for loading mold forming material onto said pattern means at said loading station, means for pivoting said support means on said carrier to invert the assembly of said support means and said pattern means for dumping excess mold forming material and thereafter returning said assembly to initial position, and means for moving said carrier relative to said oven for conveying said assembly through said oven passageway to said unloading station.

2. In a mold forming apparatus, the combination of an oven having an arcuate passageway therethrough, a rotary carrier having radial support means pivotally mounted thereon and movable through said oven passageway, separate loading and unloading stations between adjacent ends of said oven, pattern means on said support means for conveyance thereby through and out of said oven passageway to said loading station, means for loading mold forming material onto said pattern means at said loading station, means for pivoting said support means on said carrier to invert the assembly of said support means and said pattern means for dumping excess mold forming material and thereafter returning said assembly to initial position, and means for moving said carrier relative to said oven for conveying said assembly through said oven passageway to said unloading station.

3. In a mold forming apparatus, the combination of an oven having an arcuate passageway therethrough, a rotary carrier having radial support means thereon movable through said oven passageway, separate loading and unloading stations between adjacent ends of said oven, pattern means on said support means for conveyance thereby through and out of said oven passageway to said loading station, flask-mounting means carried by said support means for operative engagement with said pattern means, means for loading mold-forming material onto said pattern means for retention by said flask-mounting means, means for inverting the assembly of said support means, said pattern means and said flask-mounting means for dumping excess mold forming material and thereafter returning said assembly to initial position, means for disengaging said flask mounting means from said pattern means, and means for moving said carrier relative to said oven for conveying said support means and said pattern means through said oven passageway to said unloading station.

4. In a mold forming apparatus, the combination of an oven having a passageway therethrough, a carrier having a plurality of support means thereon movable in sequence through said oven passageway, separate loading and unloading stations, a pattern on each said support means for conveyance thereby through and out of said oven passageway to said loading station, means for loading mold-forming material onto each of said patterns at said loading station, means operable at said loading station for inverting the assembly of each of said support means and its associated pattern for dumping excess mold forming material and thereafter returning said assembly to initial position, means operable concomitantly with said inverting means at said unloading station for ejecting a finished mold from one of said patterns, and means for moving said carrier relative to said oven for conveying said assembly through said oven passageway to said unloading station.

5. In a mold forming apparatus, the combination of an oven having an arcuate passageway therethrough, a rotary carrier having a plurality of radial support means thereon movable in sequence through said oven passageway, separate loading and unloading stations between adjacent ends of said oven, a pattern on each said support means for conveyance thereby through and out of said oven passageway to said loading station, flask mounting means carried by said support means for operative engagement with said patterns, means for loading mold-forming material onto each of said patterns for retention by said flask mounting means at said loading station, means operable at said loading station for inverting the assembly of each of said support means, its associated pattern and said flask mounting means for dumping excess mold forming material and thereafter returning said assembly to initial position, means operable concomitantly with said inverting means at said unloading station for ejecting a finished mold from one of said patterns, means for disengaging said flask mounting means from said patterns, and means for moving said carrier relative to said oven for conveying said support means and said patterns through said oven passageway to said unloading station.

6. A mold forming apparatus as claimed in claim 5 wherein means are provided for returning said flask mounting means to operative engagement with each of said patterns at said unloading station.

7. Apparatus for forming baked resin-sand molds, comprising in combination, an oven having an arcuate passageway therethrough, a rotary carrier having a plurality of radial support means thereon movable in sequence through said oven passageway, a loading station between adjacent ends of said oven, a pattern on each said support means for conveyance thereby through and out of said oven passageway to said loading station, means for moving said carrier relative to said oven, control means operable for indexing said moving means for preliminary heating of said patterns, a hopper mounted for movement over said loading station, means operable on said hopper for loading mold forming material onto each said heated patterns at said loading station and thereafter returning said hopper to initial position, and means for inverting the assembly of each of said support means and its associated pattern for dumping excess mold forming material and thereafter returning said assembly to initial position for passage through said oven.

8. Apparatus as claimed in claim 7 wherein means are operatively associated with said hopper for actuating said inverting means upon return of said hopper to initial position.

9. Apparatus for forming baked resin-sand molds, comprising in combination, an oven having an arcuate passageway therethrough a rotary carrier having a plurality of radial support means thereon movable in sequence through said oven passageway, a loading station between adjacent ends of said oven, a pattern on each said support means for conveyance thereby through and out of said oven passageway to said loading station, means for moving said carrier relative to said oven, control means operable for indexing said moving means for preliminary heating of said patterns, a hopper mounted for traversing movement over said loading station, means operable on said hopper for loading mold forming material onto each said heated pattern at said loading station and thereafter returning said hopper to initial position, power means for inverting the assembly of each of said support means and its associated pattern for dumping excess mold forming material and thereafter returning said assembly to initial position for passage through said oven, control means operatively associated with said hopper for causing operation of said power means upon return of said hopper to initial position, and time delay means operably associated with said control means.

10. Apparatus as claimed in claim 9 wherein flask mounting means are carried by said support means for operative engagement with said patterns, second power means for disengaging said flask mounting means from said patterns, and second control means operatively associated with the first said power means for causing operation of the second power means upon return of said assembly to initial position prior to passage through said oven.

11. In a mold forming apparatus, the combination of oven means defining a heated zone, a rotary carrier having a plurality of circumferentially spaced support means thereon movable through said zone, separate loading and unloading stations, pattern means on said support means for conveyance thereby from said loading station through and out of said zone to said unloading station, flask means carried by said support means for operative engagement with said pattern means, means for loading mold forming material onto said pattern means for retention by said flask means, means for inverting the assembly of said support means, said pattern means and said flask means for dumping excess mold forming material from said pattern means, means for disengaging said flask means from said pattern means, and means for moving said carrier for conveying said support means and said pattern means from said loading station through said heated zone to said unloading station.

12. In a mold forming apparatus, the combination of oven means defining a heated zone, a carrier having a plurality of circumferentially spaced support means thereon movable in sequence through said zone, separate loading and unloading stations, a pattern on each of said support means for conveyance thereby through said zone, means for loading mold forming material onto each of said patterns at said loading station, means operable at said loading station for inverting the assembly of each of said support means and its associated pattern for dumping excess mold forming material from said pattern, means operable at said unloading station for ejecting a finished mold from one of said patterns while another of said patterns is in said loading station, and means for moving said carrier relative to said oven means for conveying said assembly from said loading station through said zone to said unloading station.

13. In a mold forming apparatus, the combination of an oven having a passageway therethrough, a rotary carrier, a plurality of circumferentially spaced pattern means mounted on said carrier for respective pivotal movement about horizontal axes, separate loading and unloading stations, hopper means at said loading station, means for moving said hopper means into operative engagement with one of said pattern means disposed at said loading station for depositing a predetermined quantity of mold forming material thereon and thereafter moving said hopper means out of operative engagement with said one pattern means, means for rotating each of said pattern means about its horizontal axis for dumping excess mold forming material therefrom after said hopper means moves out of operative engagement therewith, means at said unloading station for ejecting molds from said pattern means, and means for rotating said carrier for conveying said pattern means sequentially through said loading station, said oven passageway and said unloading station.

14. In a mold forming apparatus, the combination of an oven having a passageway therethrough, a rotary carrier, a plurality of angularly spaced radially extending arms mounted on said carrier, a plurality of pattern means respectively mounted on said arms, separate loading and unloading stations, hopper means at said loading station, means for moving said hopper means into operative engagement with said pattern means respectively for depositing a predetermined quantity of mold forming material thereon while the same are positioned at said loading station and thereafter moving said hopper means out of operative engagement with said pattern means, means for respectively rotating said arms for dumping excess mold forming material from said pattern means after said hopper means moves out of engagement therewith, means at said unloading station for ejecting a finished mold from one of said pattern means while another of said pattern means is in said loading station, and means for rotating said carrier for conveying said pattern means sequentially through said loading station, said oven passageway and said unloading station.

15. In a mold forming apparatus, the combination of a movable carrier, support means mounted on said carrier for pivotal movement relative thereto and movable thereby along a predetermined path, pattern means on said support means, means adjacent said carrier for loading mold forming material on said pattern means, means for imparting pivotal movement to the assembly of said support means and said pattern means for dumping excess mold forming material from said pattern means, oven means defining a heated zone around a portion of said path, and means for actuating said carrier for moving said assembly along said path into and out of said zone.

16. In a mold forming apparatus, the combination of a movable carrier, support means mounted on said carrier for pivotal movement relative thereto and movable thereby along a predtermined path, pattern means on said support means, hopper means for mold forming material adjacent said carrier, means for moving said hopper means into and out of operative engagement with said pattern means, means for conveying a predetermined quantity of mold forming material from said hopper means onto said pattern means while the same are in said operative engagement, means for imparting pivotal movement to the assembly of said support means and said pattern means for dumping excess mold forming material from said pattern means, oven means defining a heated zone around a portion of said path, and means for actuating said carrier for moving said assembly along said path into and out of said zone.

17. In a mold forming apparatus, the combination of pattern means, support means for said pattern means mounted for pivotal movement about a substantially horizontal axis, hopper means for mold forming material, means for moving said pattern means and hopper means into operative engagement for depositing a predetermined quantity of mold forming material on said pattern means and thereafter moving said pattern means and hopper means out of said operative engagement, means for removing excess mold forming material from said pattern means after separation thereof from said hopper means, said means for removing excess mold forming material comprising means for imparting pivotal movement to said support means to invert said pattern means for dumping excess mold forming material therefrom, oven means defining a heated zone, and means for moving said support means and said oven means relative to each other for positioning said pattern means within said zone.

18. In a mold forming apparatus, the combination of a movable carrier, support means mounted on said carrier for pivotal movement relative thereto and movable thereby along a predetermined path, pattern means on said support means, means adjacent said carrier for loading mold forming material on said pattern means, means for imparting pivotal movement to the assembly of said support means and said pattern means for dumping excess mold forming material from said pattern means, oven means defining a heated zone, and means for moving said pattern support means and said oven means relative to each other for positioning the pattern means with mold forming material thereon within said zone.

References Cited in the file of this patent

UNITED STATES PATENTS

| Number | Name | Date |
| --- | --- | --- |
| 1,035,374 | McWane | Aug. 13, 1912 |
| 1,250,802 | Cook | Dec. 18, 1917 |
| 1,832,626 | Geddes | Nov. 17, 1931 |
| 1,855,783 | Wood | Apr. 26, 1932 |
| 2,270,509 | Common | Jan. 20, 1942 |
| 2,481,486 | Abbott | Sept. 13, 1949 |
| 2,496,170 | Mann | Jan. 31, 1950 |
| 2,588,669 | Taccone | May 11, 1952 |

FOREIGN PATENTS

| Number | Country | Date |
| --- | --- | --- |
| 627,154 | Great Britain | July 29, 1949 |

OTHER REFERENCES

Metal Industry, December 19, 1947, page 506.